Patented Aug. 24, 1943

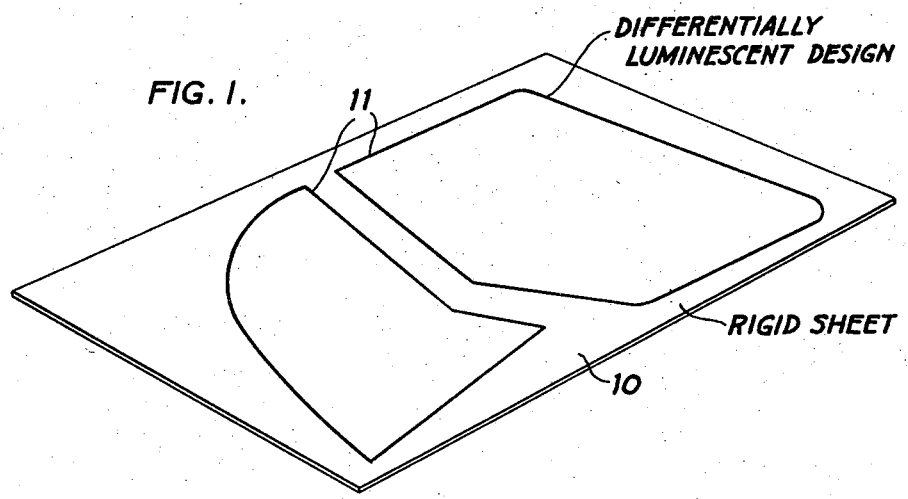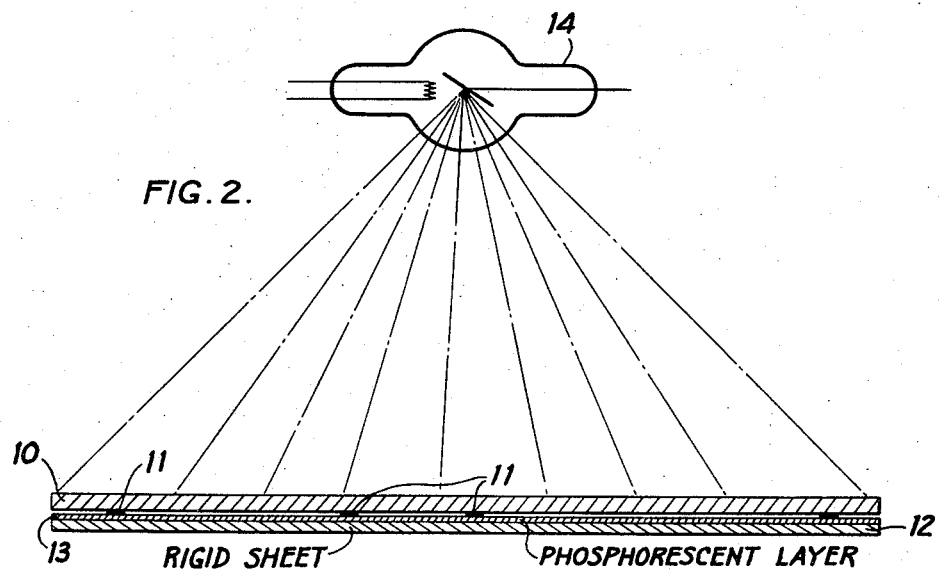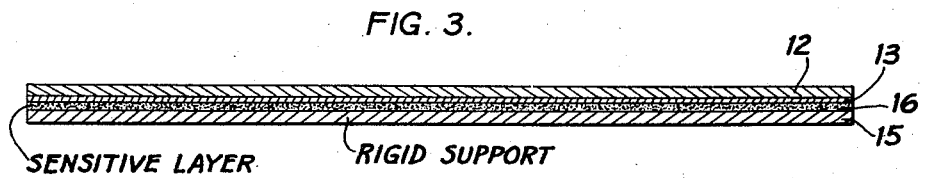

2,327,826

UNITED STATES PATENT OFFICE 2,327,826

METHOD OF REPRODUCING DRAWINGS

Harold F. Sherwood, Rochester, N. Y., assignor to Eastman Kodak Company, Rochester, N. Y., a corporation of New Jersey Application May 1, 1942, Serial No. 441,353

2 Claims. (Cl. 250—65)

This invention relates to a method of making accurate positive copies of drawings or other images, and may be considered a variation of the process disclosed and claimed in the copending application of Gerould T. Lane and Clarence L. A. Wynd, Serial No. 407,959, filed August 22, 1941, which has matured into Patent No. 2,303,942, granted December 1, 1942.

In that application there is described a process by which a drawing is made upon a metal or other rigid sheet in terms of luminescent and non-luminescent areas and this, during or immediately after activation, is held in contact with a photographically sensitive layer, thus making a mirror image of the original.

I propose to use, instead of a photographic layer, a layer of material which is rendered luminescent when activated by light of the wavelength emitted by the first luminescent layer upon which the opaque drawing has been made. The complete process then comprises the making of the luminescent drawing upon a first sheet, activating this, holding it while activated in contact with a second luminescent sheet which is thereby rendered luminescent and holding this second sheet while luminescent in contact with a photographic layer.

By this process the image is the same as the original instead of being a mirror image.

Reference will be made to the accompanying drawing in the different figures of which like characters designate like parts and in which Fig. 1 shows in perspective a drawing to be reproduced.

Fig. 2 shows in section a sheet with a luminescent image in contact with a sheet carrying a phosphorescent layer, and an X-ray tube activating the luminescent image.

Fig. 3 shows in section a sheet carrying a phosphorescent layer in contact with a photographically sensitive element.

The original drawing may for instance be scribed in plywood and the lines filled with an X-ray fluorescent material, such as a composition containing barium fluorochloride, which when activated fluoresces and phosphoresces with an ultraviolet emission. Or the drawing may be made with an opaque non-luminescent pencil or lacquer on a screen containing barium fluorochloride.

Such a sheet is shown at 10, carrying a differentially luminescent design, 11.

The second luminescent sheet 12 carries a layer 13 having a long after-glow or phosphorescence when activated by ultra-violet light. The two sheets of material may be placed in contact, with the drawing on the first sheet in contact with the luminescent layer of the second sheet, and briefly exposed to X-rays from tube 14, the length of exposure depending on the distance and strength of the source of X-rays, the efficiency of the luminescent areas of the first sheet and the sensitivity and speed of the luminescent layer of the second sheet.

Since the luminescent layer of the first sheet is much more responsive to X-rays than the second layer, the latter will not be strongly activated by the X-rays, but will be activated by the luminescence from the first sheet, which continues to phosphoresce. The second sheet has a long period of after-glow or phosphorescence and when removed from contact with the drawing is at once placed in contact with a third sheet 15, also of rigid material, carrying a photographic layer 16 which in this case should be orthochromatic, or green sensitive, because the phosphorescence of the second sheet is largely in the green portion of the spectrum.

The same phosphorescent second sheet can be quickly used again following exposure to infrared light which quenches any remaining phosphorescence.

The process may also be carried out by exposing the first sheet to X-rays while out of contact with the second sheet and then at once moving the two sheets into contact until the second sheet is strongly phosphorescent and then moving the latter into contact with a photographic plate.

An alternative screen that may be used for the second sheet, and which is responsive to the luminescence from barium fluorochloride and emits light in the blue and violet region may be made from calcium sulfide. An example of the preparation of such material will now be given, this being the invention of Herbert J. Dietz and covered in his application, Serial No. 441,411, filed concurrently herewith.

The following materials are thoroughly mixed in finely powdered form, parts being by weight:

| | Parts |
|---|---|
| Calcium oxide | 25 |
| Sulfur | 20 |
| Sodium sulfate | 2 |
| Thallium nitrate | .02 |
| Bismuth | .003 |

This is heated at 1700° F. for twenty minutes and then cooled as rapidly as possible. For the manufacture of a phosphorescent screen the resulting phosphor is dispersed in a lacquer and coated on plywood, cardboard, metal or other support. An example of such a coating composition is:

| | Parts |
|---|---|
| Phosphor | 5 |
| Butyl acetate | 5 |
| Butyl phthalate | 1 |
| 10% cellulose nitrate in butyl acetate | 1 |

With this material the photographic plate need not be specially color sensitized.

When in this specification I use the word "drawing," it is understood that I mean an image or design however made.

It is to be understood that I consider my invention to include all modifications and equivalents falling within the scope of the appended claims.

Having thus descrbied my invention, what I claim and desire to secure by Letters Patent of the United States is:

1. The method of reproducing drawings and the like which comprises making on a rigid sheet a design having areas which are rendered luminescent when activated by X-rays, exposing said sheet to X-rays whereby said areas are activated, holding said sheet while luminescent from such activation in contact with a second sheet carrying a layer which is rendered luminescent by the light emitted from the first sheet and holding said second sheet while thus luminescent in contact with a third sheet carrying a photographic layer sensitive to the luminescent light emitted from the second sheet.

2. The method of reproducing drawings and the like which comprises making on a rigid sheet a design having areas which are rendered luminescent when activated by X-rays, exposing said sheet to X-rays whereby said areas are activated, holding said sheet while luminescent from such activation in contact with a second sheet carrying a layer which is rendered phosphorescent by the light emitted from the first sheet, separating said second sheet from the first sheet and holding it while still phosphorescent in contact with a third sheet carrying a photographic layer sensitive to the luminescent light emitted from the second sheet and developing an image in the photographic layer.

HAROLD F. SHERWOOD.